US 6,687,092 B2

(12) United States Patent
Kan et al.

(10) Patent No.: US 6,687,092 B2
(45) Date of Patent: Feb. 3, 2004

(54) PIVOT BEARING ASSEMBLY FOR COMPENSATING FOR DISK DRIVE ACTUATOR TILT

(75) Inventors: Terry Kan, San Jose, CA (US); Walter Lloyd Prater, San Jose, CA (US)

(73) Assignee: Hitachi Global Storage Technologies Netherland B.V. (NL)

( * ) Notice: Subject to any disclaimer, the term of this patent is extended or adjusted under 35 U.S.C. 154(b) by 349 days.

(21) Appl. No.: 09/852,920

(22) Filed: May 10, 2001

(65) Prior Publication Data

US 2002/0167762 A1 Nov. 14, 2002

(51) Int. Cl.⁷ ................................. G11B 5/55
(52) U.S. Cl. ................ 360/265.2; 360/265.6; 360/264.4
(58) Field of Search .................. 360/265.2, 265.6, 360/264.4

(56) References Cited

U.S. PATENT DOCUMENTS

| | | | |
|---|---|---|---|
| 4,306,259 A | * | 12/1981 | Saito et al. |
| 4,544,972 A | * | 10/1985 | Kogure et al. |
| 4,657,413 A | * | 4/1987 | Hasegawa et al. |
| 5,274,288 A | * | 12/1993 | Stefansky |
| 5,283,497 A | | 2/1994 | Culp |
| 5,315,465 A | | 5/1994 | Blanks |
| 5,317,559 A | | 5/1994 | Bronsvatch |
| 5,394,283 A | * | 2/1995 | Hans et al. |
| 5,510,940 A | | 4/1996 | Tacklind et al. |
| 5,680,278 A | | 10/1997 | Sawtelle, Jr. |
| 5,724,197 A | | 3/1998 | Barnes et al. |
| 6,115,213 A | * | 9/2000 | Ikeda et al. |
| 6,191,924 B1 | * | 2/2001 | Koester |
| 6,490,138 B1 | * | 12/2002 | Prater |

FOREIGN PATENT DOCUMENTS

| | | | |
|---|---|---|---|
| EP | 0 771 002 | * | 5/1997 |
| EP | 0 771 003 | * | 5/1997 |
| JP | 63-274338 | * | 11/1998 |
| WO | WO 96/29521 | * | 9/1996 |

OTHER PUBLICATIONS

"Optimization of Ball Bearing Runout For Linear Actuators," Jan. 1990, IBM Technical Disclosure Bulletin, pp. 253–254.

* cited by examiner

*Primary Examiner*—Craig A. Renner
(74) *Attorney, Agent, or Firm*—Robert B. Martin; Bracewell & Patterson, L.L.P.

(57) ABSTRACT

A disk drive pivot assembly design has a shaft that supports two actuators. The pivot assembly design compensates for the tilting of the actuators due to shaft bending during seek operations. Two types of bearings of differing stiffness are used to achieve improved performance. The axially innermost bearings are stiffer than the axially outermost bearings, which are relatively compliant. By having two different bearing stiffnesses, the boundary conditions of the pivot assembly are adjustable and can compensate for shaft bending, which is greatest near the center of the pivot assembly.

11 Claims, 2 Drawing Sheets

US 6,687,092 B2

PIVOT BEARING ASSEMBLY FOR COMPENSATING FOR DISK DRIVE ACTUATOR TILT

BACKGROUND OF THE INVENTION

1. Technical Field

The present invention relates in general to an improved disk drive, and in particular to an improved pivot assembly for a disk drive. Still more particularly, the present invention relates to an improved actuator bearing design in a pivot assembly for a disk drive for improving the performance of the disk drive.

2. Description of the Related Art

Generally, a digital data storage system consists of one or more storage devices that store data on storage media such as magnetic or optical data storage disks. In magnetic disk storage systems, a storage device is called a hard disk drive (HDD), which includes one or more hard disks and an HDD controller to manage local operations concerning the disks. Hard disks are rigid platters, typically made of aluminum alloy or a mixture of glass and ceramic, covered with a magnetic coating. Typically, several platters are stacked vertically on a common spindle that is turned by a disk drive motor at several thousand revolutions per minute.

Within most drives, one read/write head is associated with each side of each platter and flies just above or below the platter's surface. Each read/write head is connected to a semi-rigid arm apparatus which supports the entire head flying unit. More than one of such arms may be utilized together to form a single armature unit. Each read/write head scans the hard disk platter surface during a "read" or "write" operation. The head/arm assembly is moved utilizing an actuator having an actuator body mounted on a pivot assembly. The actuator is often a voice coil motor (VCM) having a stator that is mounted to a base plate or casting. The base casting is also the foundation for a rotatable spindle that supports the disks. The base casting is mounted to a frame via a compliant suspension. When current is fed to the motor, the VCM develops force or torque which is substantially proportional to the applied current. As the read/write head nears the desired track, a reverse polarity signal is applied to the actuator, causing the signal to act as a brake, and ideally causing the read/write head to stop directly over the desired track.

Modern HDD throughput and storage capacity have been substantially increased by improvement in actuator design which has resulted in increased precision and speed in head placement. The more precisely the actuator can place the read/write head, the greater the track density of the drive. However, rotary actuators have structural resonance modes that can affect disk drive performance. Some structural modes apply a reaction force against the pivot bearing, thereby tilting or rocking the actuator body on the pivot. Angular displacements of less than a milliradian of actuator tilt will cause the heads of the drive to go off-track.

For example, as shown in FIG. 1, a stacked actuator pivot has a pair of actuator bodies 43, 45 that are pivotally mounted to a shaft 47. When both actuator bodies 43, 45 are seeking on the same shaft 47, their combined forces can cause shaft 47 to deflect in an arc. This deflection results in out-of-phase and in-phase tilting of the fundamental vibration mode, which is also known as the "butterfly" mode. The center of the deflection force during seeking on the stacked actuator pivot is not located at the center of shaft 47. This causes the heads 49 on the arms 51 nearest the axial center of the pivot to deflect the most, as depicted on the left side of FIG. 1 by blocks 3 and 4. In contrast, the heads 53 on the axially outermost arms 55 deflect the least, as depicted by blocks 0 and 7. Actuator pivot tilting is problematic for head switching track misregistration (TMR), which degrades the performance of the disk drive. Thus, an improved apparatus and method for overcoming deflection of actuator pivots is needed.

SUMMARY OF THE INVENTION

One embodiment of a disk drive pivot assembly design has a shaft that supports two actuators. The pivot assembly design compensates for the tilting of the actuators due to shaft bending during seek operations. Two types of bearings of differing stiffness are used to achieve improved performance. The axially innermost bearings are stiffer than the axially outermost bearings, which are relatively compliant. By having two different bearing stiffnesses, the boundary conditions of the pivot assembly are adjustable and can compensate for shaft bending, which is greatest near the center of the pivot assembly. Track misregistration due to actuator tilt is decreased by compensating the shaft deflection through appropriate stiffening of the pivot.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages, and objects of the present invention, as well as others that will become apparent, are attained and can be understood in more detail, more particular description of the present invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DESCRIPTION OF THE PREFERRED EMBODIMENT

Figure 1:
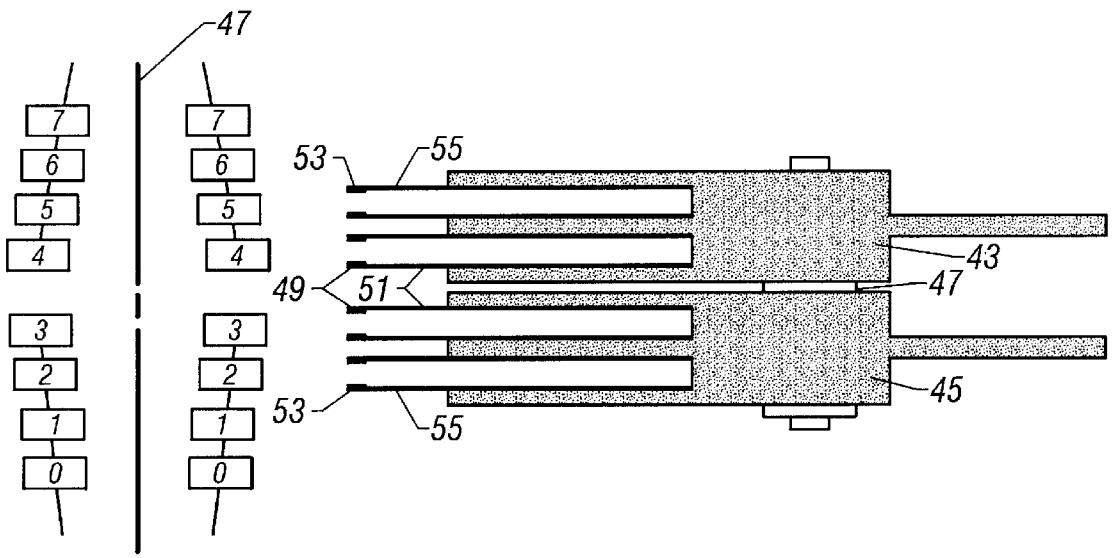
FIG. 1 is a schematic side view of a prior art disk drive actuator pivot assembly illustrating actuator tilt.
Figure 2:
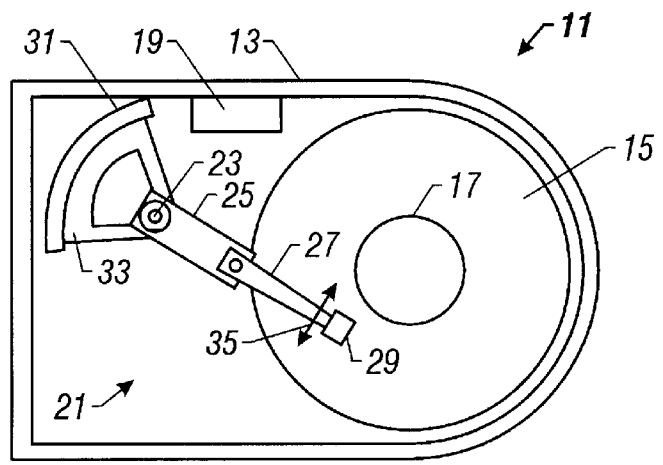
FIG. 2 is a plan view of a disk drive constructed in accordance with the present invention.

Referring to FIG. 2, a schematic drawing of an information storage system comprising a magnetic hard disk drive 11 is shown. Drive 11 has a housing 13 containing a plurality of stacked, parallel magnetic disks 15 (one shown) which are closely spaced apart. Disks 15 are rotated by a spindle motor (not shown) located therebelow about a central drive hub 17. An actuator 21 having a plurality of axially stacked, actuator comb bodies (preferably two) is pivotally mounted to housing 13 about a pivot assembly 23. A controller 19 is mounted to housing 13 for selectively moving actuator 21 as will be described below.

Actuator 21 has a mounting support 25, a pair of parallel, cantilevered load beams or suspensions 27 extending from mounting support 25, and a head gimbal assembly 29 having at least one magnetic read/write head secured to each suspension 27 for magnetically reading data from or magnetically writing data to disks 15. Suspensions 27 have a spring-like quality which biases or maintains them in parallel relationship relative to one another. A motor assembly 31 having a conventional voice coil motor 33 is also mounted to pivot assembly 23 opposite head gimbal assemblies 29. Movement of actuator 21 (indicated by arrows 35) moves head gimbal assemblies 29 radially across tracks on the disks 15 until the heads on assemblies 29 settle on the target tracks.

Figure 3:
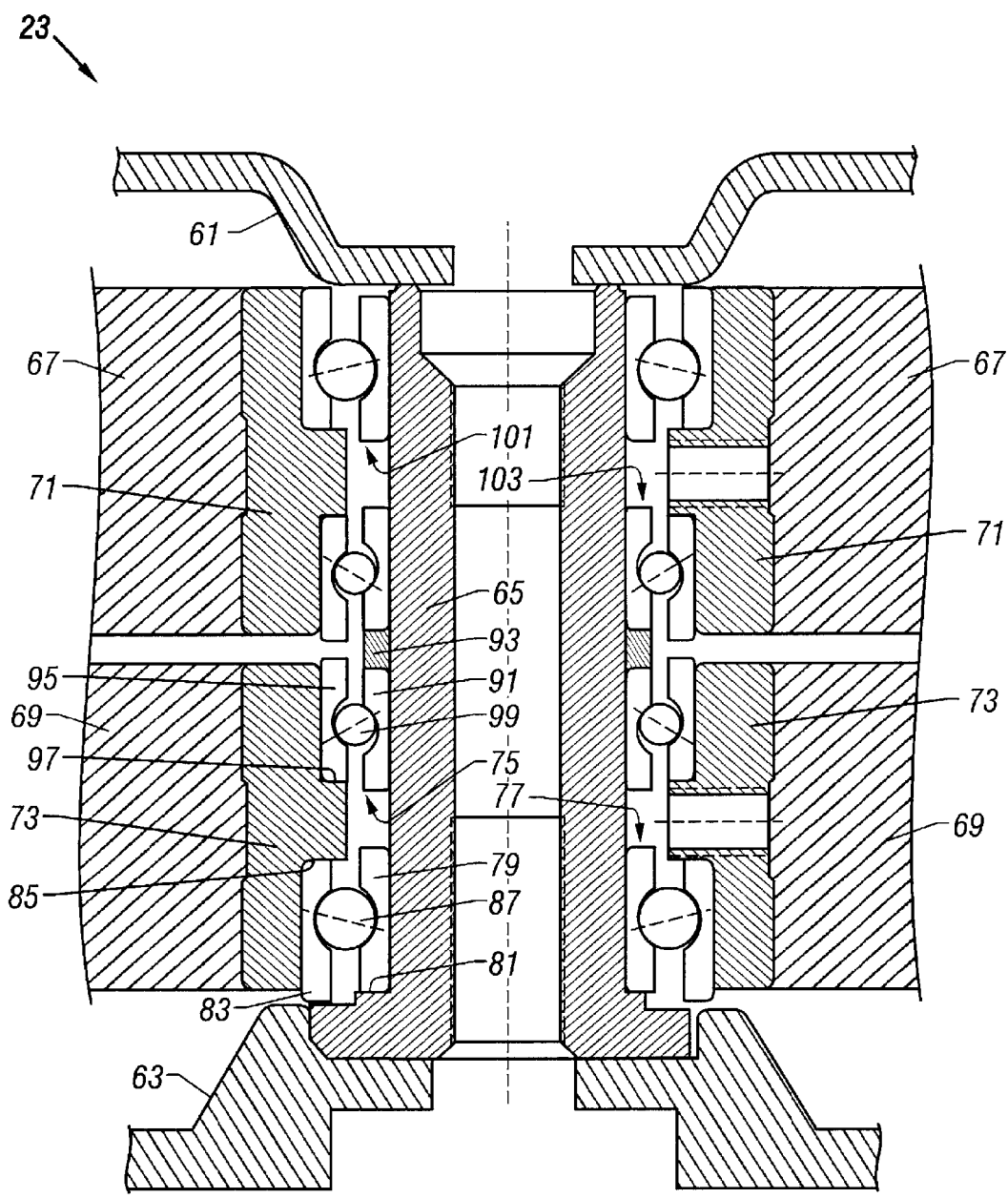
FIG. 3 is a sectional side view of one embodiment of a pivot assembly for the disk drive of FIG. 2.

As shown in FIG. 3, one embodiment of pivot assembly 23 is mounted between a top cover 61 and a base plate 63, such as those of housing 13. Pivot assembly 23 has a stationary axial shaft 65 that extends between top cover 61 and base plate 63 and is secured thereto with fasteners or other fastening means (not shown). In the version shown, pivot assembly 23 is designed to independently support two actuator bodies 67, 69 on two pivot sleeves: a "top" sleeve 71 and a "bottom" sleeve 73, respectively. Actuator bodies 67, 69 are fixed to their respective sleeves 71, 73 such that there is no relative motion between them.

Bottom sleeve 73 is pivotally mounted to shaft 65 on two bearings 75, 77. Bearing 77 is located axially outward of bearing 75 relative to shaft 65. Bearing 77 has an inner race 79 that abuts a shoulder 81 on the outer surface of shaft 65. Bearing 77 also has an outer race 83 that abuts shoulder 85 on the inner surface of bottom sleeve 73. Ball bearings 87 are located between races 79, 83, preferably at a low contact angle (approximately 10 degrees) as shown. Bearing 75 has an inner race 91 that abuts a rigid spacer 93, an outer race 95 abutting a shoulder 97 on bottom sleeve 73, and ball bearings 99 therebetween which are preferably at a high contact angle (approximately 30 degrees) as shown. Top sleeve is pivotally supported on two bearings 101, 103 that are identical to bearings 75, 77, respectively, and mounted to shaft 65 in a manner similar to that described above.

The heart of the present invention and the critical difference between inner bearings 75, 103 and outer bearings 77, 101 is the use of their relative stiffnesses to overcome actuator tilt. Ball bearing geometry has several parameters that strongly influence the axial and radial stiffness of a pivot assembly. The diameter of the ball train, raceway curvature, the number of balls, the ball diameter, and the radial internal clearance all affect the contact angle, which is a determining factor in the stiffness of the ball bearing. The bearing span combined with the ball bearing design influences the overall pivot stiffness.

In the preferred embodiment, inner bearings 75, 103 have a greater stiffness than outer bearings 77, 101, which are relatively compliant in comparison. For example, in one version of the present invention, inner bearings 75, 103 comprise relatively stiff NMB Company model number 740 bearings (7 mm outer diameter (OD), 4 mm inner diameter (ID), 2.5 mm width; and 11 balls, each having a 0.79 mm ball diameter), while outer bearings 77, 101 comprise relatively compliant NMB Company model number 840 bearings (8 mm OD, 4 mm ID, 3 mm width; and seven balls, each having a 1.19 mm ball diameter). In another version of the present invention, inner bearings 75, 103 comprise relatively stiff NMB Company model number 850 bearings (8 mm OD, 5 mm ID, 2.5 mm width; and 13 balls, each having a 0.79 mm ball diameter), while outer bearings 77, 101 comprise the same relatively compliant 840 bearings described above. In computer modeling, the 740 and 850 bearings had approximately twice as much combined axial stiffness and radial stiffness as the 840 bearing.

The present invention has several advantages. By increasing the inboard bearing stiffness near the center of the pivot shaft and by making the outboard bearing compliant, the tilt of the actuators relative to the axis of the pivot shaft is greatly diminished. Having two different bearing stiffness enables the boundary conditions of the pivot to be more precisely controlled and can compensate for shaft bending, which, in the prior art, was greatest near the center of the shaft. With the present invention, actuator tilt is decreased by stiffening the bearings near the axial center of the shaft while using more compliant bearings near the axial ends of the shaft.

While the invention has been shown or described in only some of its forms, it should be apparent to those skilled in the art that it is not so limited, but is susceptible to various changes without departing from the scope of the invention.

What is claim is:

1. A pivot assembly for a disk drive, comprising:
   a shaft;
   a first pivot sleeve pivotally mounted to the shaft on a first bearing type and a second bearing type;
   a second pivot sleeve pivotally mounted to the shaft, independently of the first pivot sleeve, on the first bearing type and the second bearing type; and wherein
   the first bearing type has a first stiffness that is less than a second stiffness of the second bearing type to compensate for tilting of a disk drive actuator due to the shaft bending during operation.

2. The pivot assembly of claim 1 wherein the first bearing type is located axially outward of the second bearing type.

3. The pivot assembly of claim 1 wherein the first bearing type has approximately twice as much combined axial stiffness and radial stiffness as the second bearing type.

4. A disk drive, comprising:
   a rotatable data storage media;
   an actuator having a movable arm and a head on the arm for reading and writing information to the data storage media;
   a pivot assembly for supporting the actuator and having at least three axially spaced-apart bearings located between the actuator and a shaft; and wherein
   the bearings have differing stiffnesses to compensate for tilting of the actuator due to shaft bending during operation.

5. The disk drive of claim 4 wherein an axially innermost bearing is more stiff than an axially outermost bearing, which is relatively compliant.

6. The disk drive of claim 4 wherein the actuator comprises a pair of actuator bodies, each of which is independently mounted to a separate pivot sleeve.

7. The disk drive of claim 4 wherein the pivot assembly comprises a first set of beatings that is located axially inward of a pair of axially outer bearings.

8. The disk drive of claim 4 wherein the pivot assembly has a first set of bearings having approximately twice as much combined axial stiffness and radial stiffness as a second set of bearings.

9. A disk drive, comprising:
   a rotatable data storage media;
   a stacked actuator having a pair of axially spaced-apart actuator bodies, each having a movable arm and a head on the arm for reading and writing information to the data storage media;
   a pivot assembly having a shaft and a pair of pivot sleeves for independently supporting individual ones of the actuator bodies, the pivot assembly also having a set of axially inner bearings and a set of axially outer bearings, each of which is located between the shaft and one of the actuator bodies; and wherein
   the axially inner bearings have a first stiffness that differs from a second stiffness of the axially outer bearings to compensate for tilting of the stacked actuator due to shaft bending during operation.

10. The disk drive of claim 9 wherein the first stiffness is greater than the second stiffness.

11. The disk drive of claim 9 wherein the axially inner bearings have approximately twice as much combined axial stiffness and radial stiffness as the axially outer bearings.

* * * * *

UNITED STATES PATENT AND TRADEMARK OFFICE
CERTIFICATE OF CORRECTION

PATENT NO. : 6,687,092 B2  Page 1 of 1
DATED : February 3, 2004
INVENTOR(S) : Terry Kan et al.

It is certified that error appears in the above-identified patent and that said Letters Patent is hereby corrected as shown below:

Column 4,
Line 39, "beatings" should read -- bearings --

Signed and Sealed this

Eleventh Day of May, 2004

JON W. DUDAS
*Acting Director of the United States Patent and Trademark Office*